(12) United States Patent
Mahn et al.

(10) Patent No.: US 11,060,618 B2
(45) Date of Patent: Jul. 13, 2021

(54) INTEGRAL TILTED POPPET VALVE FOR CONTROLLED FLOW OF FUEL FROM FUEL DISPENSING NOZZLE

(71) Applicants: Gerald a Mahn, Arnold, MO (US); Grenville G Sutcliffe, Villa Ridge, MO (US)

(72) Inventors: Gerald a Mahn, Arnold, MO (US); Grenville G Sutcliffe, Villa Ridge, MO (US)

(73) Assignee: Husky Corporation, Pacific, MO (US)

( * ) Notice: Subject to any disclaimer, the term of this patent is extended or adjusted under 35 U.S.C. 154(b) by 0 days.

(21) Appl. No.: 16/873,743

(22) Filed: Jun. 22, 2020

(65) Prior Publication Data

US 2020/0370656 A1    Nov. 26, 2020

Related U.S. Application Data

(63) Continuation-in-part of application No. 29/651,868, filed on May 21, 2019, now abandoned.

(60) Provisional application No. 62/921,693, filed on Jun. 28, 2019.

(51) Int. Cl.
| | |
|---|---|
| *F16K 1/36* | (2006.01) |
| *B67D 7/44* | (2010.01) |
| *F16K 31/60* | (2006.01) |

(52) U.S. Cl.
CPC ............... *F16K 1/36* (2013.01); *B67D 7/44* (2013.01); *F16K 31/602* (2013.01)

(58) Field of Classification Search
CPC ........... F16K 1/36; F16K 31/602; B67D 7/42; B67D 7/44; B67D 7/52
See application file for complete search history.

(56) References Cited

U.S. PATENT DOCUMENTS

| | | | | | |
|---|---|---|---|---|---|
| 1,850,063 | A | ‡ | 2/1929 | Pepper ..................... | B67D 7/42 137/61 |
| 2,314,553 | A | ‡ | 4/1941 | Palm ....................... | F16K 21/04 137/55 |
| 2,622,435 | A | ‡ | 9/1948 | Lucas ................. | G01N 15/0618 73/61 |
| 3,062,247 | A | ‡ | 12/1959 | Botkin ..................... | B67D 7/48 141/20 |
| 3,005,476 | A | ‡ | 3/1960 | Klaus ...................... | B67D 7/48 141/22 |
| 3,988,001 | A | ‡ | 12/1976 | Kankaras ............. | A61C 1/0038 251/22 |

(Continued)

*Primary Examiner* — Kevin L Lee
(74) *Attorney, Agent, or Firm* — Paul M. Denk

(57) ABSTRACT

An integral tilted poppet valve for controlled flow of fuel from a fuel dispensing nozzle, including a poppet skirt, embodied within the poppet valve accessory of this invention, the poppet skirt cooperates with the poppet stem, and the poppet holder and its seal disc, to furnish a sealing of the nozzle, through the poppet valve, when the fuel nozzle is not in use, but that upon actuation of the nozzle lever, elevating its poppet stem, the poppet skirt includes an upper inclined surface for biasing against the poppet holder and its seal disc, to tilt the opening of the nozzle to provide for a minor or trickle flow of fuel through the nozzle to furnish a more precise dispensing of the quantity and value of the fuel being delivered to a vehicle.

7 Claims, 6 Drawing Sheets

(56) References Cited

U.S. PATENT DOCUMENTS

| | | | | |
|---|---|---|---|---|
| 4,031,930 | A | * | 6/1977 | Sutcliffe et al. ......... B67D 7/48 141/207 |
| 4,397,447 | A | * | 8/1983 | Fink, Jr. .................. F16K 21/04 141/206 |
| 4,523,700 | A | ‡ | 6/1985 | Bower ..................... B67D 7/42 222/50 |
| D570,375 | S | ‡ | 6/2008 | Hideki ............................ D15/7 |
| D577,100 | S | ‡ | 9/2008 | Brown ......................... D23/213 |
| D682,989 | S | ‡ | 5/2013 | Eagle ................ A61M 15/0086 D23/233 |
| D715,404 | S | ‡ | 10/2014 | Clarke ......................... D23/233 |
| D724,182 | S | ‡ | 3/2015 | Lu ................................. D23/233 |
| D739,500 | S | ‡ | 9/2015 | Buermann ................... D23/249 |
| D739,919 | S | ‡ | 9/2015 | Alexander ................... D23/233 |
| D748,228 | S | ‡ | 1/2016 | Bayyouk ..................... D23/269 |
| D756,747 | S | ‡ | 5/2016 | Wu ................................. D8/352 |
| 9,593,006 | B2 | * | 3/2017 | Weepie ................... B67D 7/42 |
| D787,029 | S | ‡ | 5/2017 | Bayyouk ..................... D23/269 |
| D824,030 | S | ‡ | 7/2018 | Holley ......................... D24/155 |

\* cited by examiner
‡ imported from a related application

INTEGRAL TILTED POPPET VALVE FOR CONTROLLED FLOW OF FUEL FROM FUEL DISPENSING NOZZLE

CROSS REFERENCE TO RELATED APPLICATION

This is the non-provisional application of the provisional application having Ser. No. 62/921,693, filed on Jun. 28, 2019; and this current non-provisional application is a continuation-in-part of the design application having Ser. No. 29/651,868, filed in the United States Patent Office on May 21, 2019.

FIELD OF THE INVENTION

This invention generally relates to fuel dispensing, from a fuel dispensing nozzle, and more specifically pertains to the integration of a tilt into the structure of the poppet valve, for a fuel dispensing nozzle, that allows for the controlled and trickled flow the dispensing of fuel, in order to allow the customer to dispense fuel approximately to a specified prices, such as, for example, when the price of fuel is high, and the customer or service station attendant may have difficulty dispensing fuel to the desired amount.

BACKGROUND OF THE INVENTION

This invention particularly relates to the control dispensing of fuel at finite increments from a fuel dispensing nozzle incorporating an integral and built in tilted poppet valve that allows for the precisely controlled flow of fuel from a fuel dispensing nozzle so that a finite dollar amount of fuel can be dispensed to a specified value.

Fuel dispensing nozzles, for dispensing fuel into vehicles, have generally been around as long the invention of the automobile. Such nozzles have been refined in their construction to the point where they are very precise in the bulk dispensing of fuel, and also furnishes vapor control that draws the gasoline fumes back into the dispensing system, provides for automatic shut-off of a nozzle particularly when the vehicle fuel tank has reached capacity, and many other improvements that are embodied within current date nozzles and which require numerous parts that are interrelated, and function together, to achieve all the foregoing types of uses and results. One of the problems, though, even with current day nozzles, is that since self-serving has become the standard in the dispensing of fuel into the vehicle, trying to deliver fuel into the vehicle tank at a precise amount, or volumetric capacity, is still not done with any consistency. Thus, when the customer enters the service station and begins to dispense, it is sometimes difficult to stop the dispensing at the precise monetary amount that the customer desires.

Efforts have been made to remedy this problem, and as can be seen in the U.S. Pat. No. 4,523,700, to Bower, et al, upon a low flow controlled nozzle, this particular poppet assembly includes a separate lifter, as noted, that attempts to tilt the opening of its shown poppet, in order to attain more precision in the flow control of the fuel, into a vehicle, seldom achieved, much to the dissatisfaction of the customer. As stated in said patent, at that time, a penny's worth of fuel has become more and more difficult to meter, upon delivery of gasoline to the fuel tank of an automobile.

The early patent to Lucas, et al, U.S. Pat. No. 2,622,435, shows a related type of means for manipulating a valve of a pump, one that is used as a sediment tester for a milk can, and this device includes a means for slightly opening of a valve member, that incorporates a wedge shaped portion, by biasing it through contact with a plunger, in order to obtain a sample of fluid from the bottom of the milk casing during usage of this pump device.

A further related type of structure can be seen in the variable flow control valve for use with dental syringes, and the like, as noted in the U.S. Pat. No. 3,988,001, to Kankaras. This particular device incorporates a valve within a syringe that has an actuator which when moved axially engages a valve seal member that rocks the member upon its valve seat, so as to achieve initially only a portion of the valve to open, about its periphery, when seating upon the said valve seal member. In other words, when the push button is depressed, on the syringe, its cam like depending stem engages a cam follower provided upon the body portion of the valve, so as to cause the cam to tilt the valve member and allow for a linear volume control of the fluid flow from a zero flow as when the dental syringe is applied during patient treatment. It does show structure for its specific tilting of a valve, from its seal, to allow partial fluid flow, when the syringe is initially applied.

The very early patent to Palm, U.S. Pat. No. 2,314,553, shows another form of control valve, for controlling the discharge of a fluid from pumps, wherein its valve is tilted from its valve seat by extending a plunger laterally against the valve stem, during usage, as can be noted therein. This is a very specific structure for use for tilting of a valve.

An even earlier patent to Pepper, U.S. Pat. No. 1,850,063, shows a hose nozzle for dispensing apparatus. This simply shows a very early poppet valve used for controlling the discharge of liquid, such as gasoline, at a filing station, when the discharge of the gasoline from the dispensing apparatus is controlled by, what is identified as, a valvular nozzle. Another U.S. Pat. No. 3,005,476, shows an automatic safety nozzle, for use at a gasoline dispensing pump, wherein its poppet can be lifted and opened in order to dispense fuel. A final patent to Botkin, U.S. Pat. No. 3,062,247, shows a further automatic dispensing nozzle. This nozzle shows an early type of valve used in a dispensing nozzle at a filing station.

These are examples of various types of gasoline dispensing nozzles, their early structures, and other types of valving mechanisms within the fluid handling the devices, which may even be tilted, in order to control the flow of liquid from such devices.

SUMMARY OF THE INVENTION

This invention primarily relates to the integration into the structure itself of the valve portion of a poppet valve, orienting the upper valve surface at specific angular degrees from the perpendicular to the axis of the poppet stem, so that as the nozzle lever is slightly lifted, the poppet valve seal is slightly tilted to allow for a trickle flow of fuel to be delivered by the nozzle to the vehicle fuel tank, and allow the customer to regulate, to the cent, the amount of fuel being dispensed.

Thus, in the concept of this invention, and through its usage, one can provide for the residual dispensing of fuel, so that the car owner can top off the fuel tank, or receive fuel to a precise quantity or value, during refueling.

As is well known, and as reviewed in the background of this invention, the poppet, or the main valve of the nozzle, includes a series of components that are operated by the nozzle lever, and allows the flow of fuel through the nozzle, and out of the spout, for delivery to the vehicle fuel tank. The standard poppet employs a poppet stem, a poppet skirt, which is what is modified itself, in the design of this invention, a poppet seal, and also includes a poppet cap. As well known, when the lever of the nozzle is lifted, it makes contact with the bottom of the poppet stem, which is forced upwardly. The poppet stem, in turn, forces the poppet skirt upwards, into the poppet seal-poppet holder, which compresses the main spring, and creates an opening through which fuel may flow through the nozzle, and out of the spout for delivery to the vehicle fuel tank. Then, when the nozzle shuts off automatically, or when the lever is released, the main spring forces the poppet holder, the poppet seal, the poppet skirt, and the poppet stem promptly back downwardly, and the poppet seal makes contact with the sealing surface on the nozzle body casting, thus prohibiting any further fuel flow through the nozzle.

The difference between the tilt poppet design of this invention, and the standard poppet design, is the shape of the poppet skirt itself, and the way in which the poppet seal is lifted off of the sealing surface of the nozzle body casting. The tilt poppet skirt, of this invention, employs integrally an inclined surface, for lifting of the seal, which is what is raised off the sealing surface of the nozzle body casting. This inclined upper surface for the poppet skirt peels the poppet skirt off of the sealing surface of the nozzle body casting, as opposed to lifting the seal straight up. In doing so, the user is much more capable of slightly cracking open the main poppet valve, and thus dispensing fuel in very small incremental amounts, otherwise known in the art as "rounding to the penny." This feature of the tilt poppet concept, of this invention, and the basic function of this design is to allow the customer to more easily control the flow of miniscule amounts of fuel, during dispensing.

As is known in this art, when the fuel flow is zero, such as when the poppet valve is completely closed, obviously, no fuel flows through the dispensing nozzle. As the lever is raised, the fuel flow increases depending upon the travel of the tilt poppet skirt/poppet seal. Obviously, an analysis of fuel flow, through a nozzle, from station-to-station, depends upon the fuel pressure supplied from the pump to the nozzle, and such will vary the fueling from point-to-fueling, within any given station, as the fuel pressure supplied from the pump to the nozzle will vary depending upon the distance between the pump and the fueling position. Typically, gasoline dispensing fuel nozzles are regulated to roughly 10 gallons per minute or less of fuel flow. Diesel dispensing fuel nozzles are not normally regulated in the same way, but typically see a higher flow rate. Some preferred nozzles are capable of flowing as high as 15 gallons per minute, but normally, by regulation, such flows are limited to ten gallon per minute.

In testing, when test nozzles are used, and when the nozzle lever is raised to its highest position, the poppet is opened to its fullest extent. Fuel flow from such testing that was achieved at a time of 10.23 gallons per minute (38.72 liters per minute). In the ability to round out to the penny during the use of the nozzle, by slightly raising the lever and cracking the poppet valve, through use of the current invention, at a given supply pressure, one could easily control the flow of fuel, and achieve a flow rate as low as 0.05 gallons per minute (0.19 liters per minute). At the current price of $2.66 per gallon, this translated roughly to one penny's worth of fuel dispensed every five seconds. Obviously, if the lever is raised beyond that point, the flow rate substantially increases. So, if the total range of fuel flow for this inventive nozzle, and its particular poppet valve seal, and at this particular fueling position, when the nozzle lever is slightly opened, the 0.05 gallons per minute to 10.23 gallons minute can be attained through usage of the concept of the current invention. It is believed that similar numbers would be found and achieved with other nozzle models, incorporating the design of this invention, as the design structure when incorporated into the poppet system is the same for other poppet skirts structured and utilized as identified for this invention.

As previously reviewed, the poppet skirt of this invention, as used within the poppet assembly, has a designed degree of incline, or slant, upon its upper surface, so that as it encounters the seal disc of the poppet holder, it will slightly lift one side of the seal disc off of the valve seat as formed upon the internal structure of the nozzle, where the poppet assembly locates within the nozzle body, to achieve that slight flow, and where the seal disc of the poppet holder encounters the nozzle seat, completely shuts off the flow of any fuel through the nozzle, as during non-usage, or when a fueling has been completed.

The integrated tilted poppet valve for this invention, and more specifically its poppet skirt, will have an integral incline, with respect to the horizontal, of approximately 2 degrees to 4 degrees of tilt. Thus, when the poppet skirt encounters the poppet seal disc, that point of the skirt that initially contacts the seal disc will slightly elevate that part of the seal disc off of the nozzle valve seat, that allows for that type of trickle or miniscule flow of fuel through the nozzle, and which generally is performed at the end of a refueling function, in order to attain that topping off, or delivery of fuel to round out to the penny, of the amount of fuel dispensed into the vehicle fuel tank. Obviously, that type of integral tilt, provided within the poppet skirt, could range anywhere from a low degree of slant, such as at 1%, and up to as high as even approximately 5%, or more, in order to get the type of favorable trickle flow of fuel from the nozzle, particularly at the terminus of a fueling cycle.

Even with the amount of slant integrated into the poppet skirt of this invention, and that part of which initially contacts the poppet seal disc, when the handle lever for the nozzle is fully released, the seal disc of the poppet holder will be allowed to fully seal against the valve seat, to curtail any further flow of fuel. Likewise, when the lever handle for the nozzle is fully opened, and the poppet skirt biases against the seal disc and raises it to its fully opened position, the amount of slant built into the poppet skirt has no effect upon the full flow of fuel through the dispensing nozzle, for rapid refueling of a vehicle. It is only when the nozzle lever is slightly elevated, and the incline of the poppet skirt has an effect upon the poppet seal disc, as previously reviewed, is when the minor or trickle flow of fuel through and from the nozzle, can be easily and effectively attained.

It is, therefore, the principal object of this invention to provide for a structured and integral slant along the top surface of a poppet skirt, in order to have a controlled effect upon the elevation of the poppet seal disc and its holder, to allow for miniscule flow of fuel through to the nozzle, during dispensing of gasoline to an automobile, or diesel fuel to other vehicles.

Another object of this invention is to provide for controlled usage of a dispensing nozzle that allows the self-serving customer to control the delivery of small amounts of fuel to his/her vehicle.

Another object of this invention is to provide for a structured tilt built into a poppet skirt, itself, so as to more precisely control the delivery of minor amounts of fuel to a vehicle during refueling.

Another object of this invention is to provide an integrally structured means to substantially reduce and manage the flow of small amounts of fuel through any fuel dispensing nozzle, without necessitating the addition of any other structure into the poppet assembly, as was previously required in earlier prior art embodiments designed to control fuel flow.

These and other objects may become more apparent to those skilled in the art upon review of the summary of the invention as provided herein, and upon undertaking a study of the description of Its preferred embodiment in view of the drawings.

DESCRIPTION OF THE PREFERRED EMBODIMENT

Figure 2:
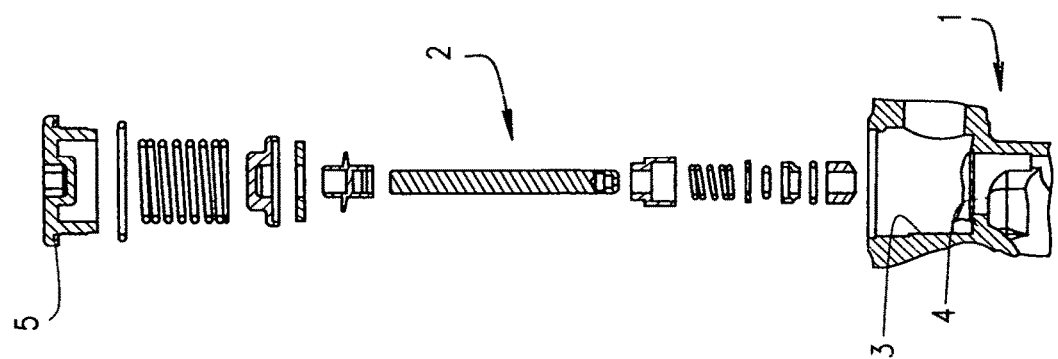
FIG. 2 is a further view of the separated components of the poppet assembly.
Figure 1:
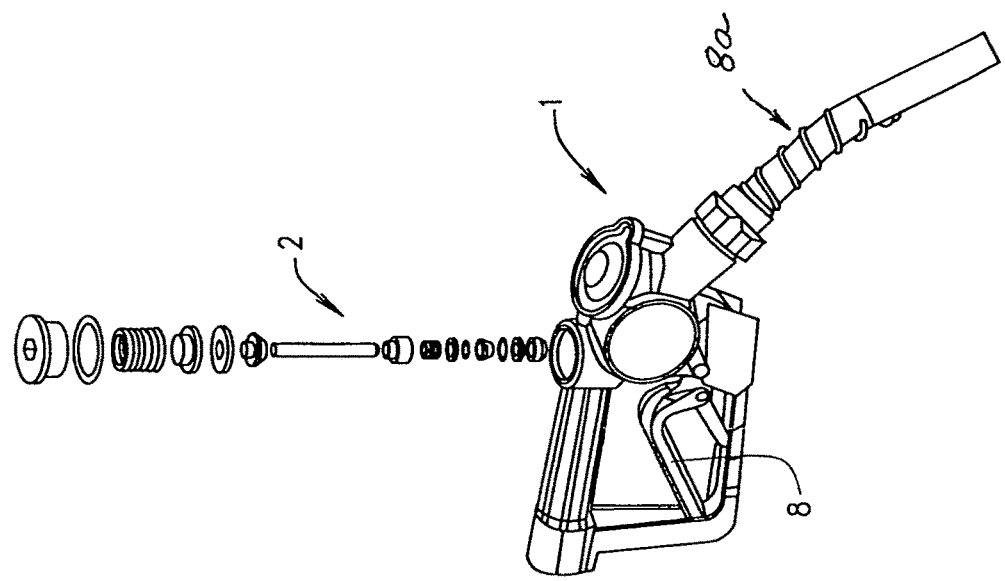
FIG. 1 presents an isometric view of the fuel dispensing nozzle of this invention, and showing there above an exploded view of the various components that make up the poppet assembly of said invention.
Figure 3:
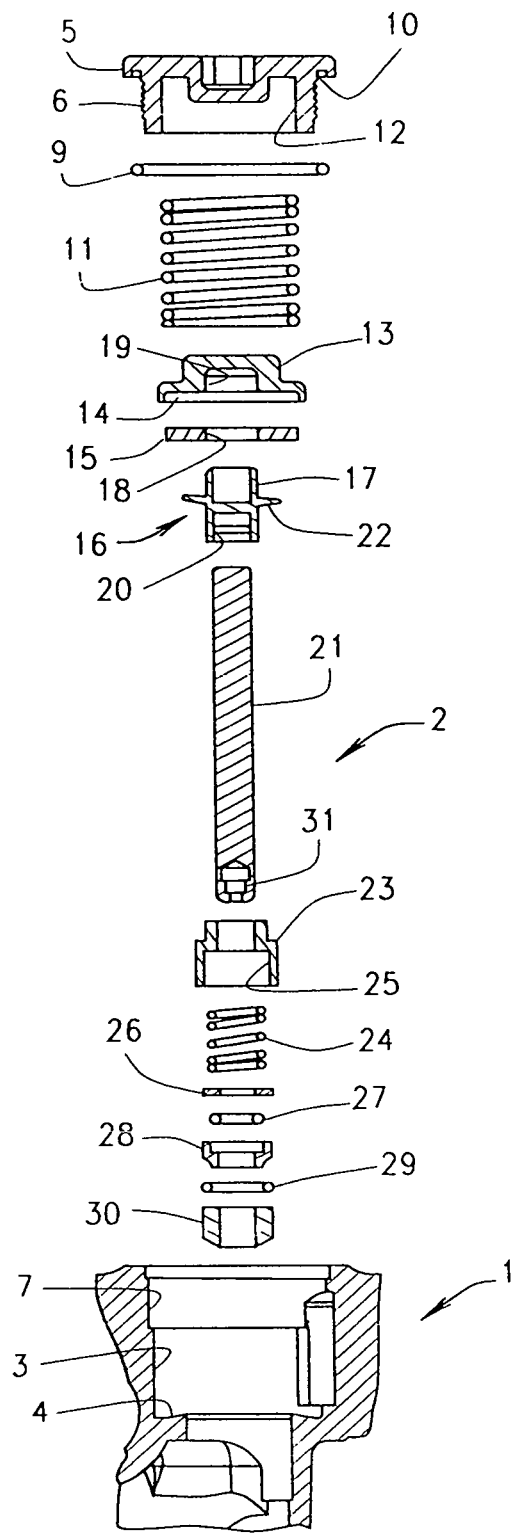
FIG. 3 shows even greater detail in the components of the poppet assembly.
Figure 4:
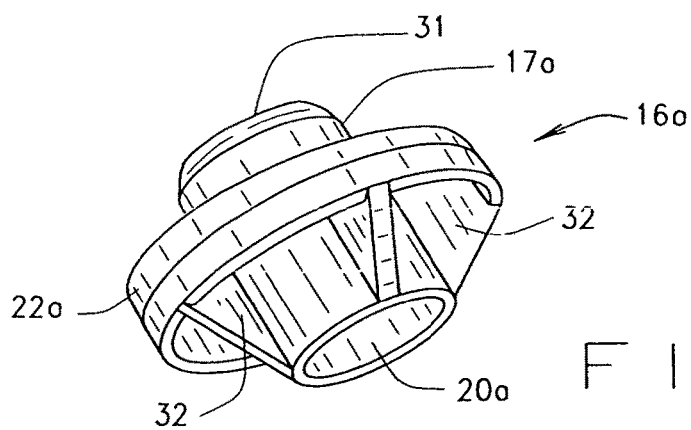
FIG. 4 is an isometric view of one embodiment for the tilt poppet skirt of this invention.
Figure 5:
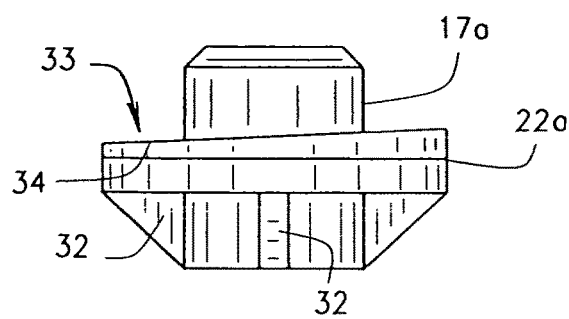
FIG. 5 is a front view thereof.
Figure 6:
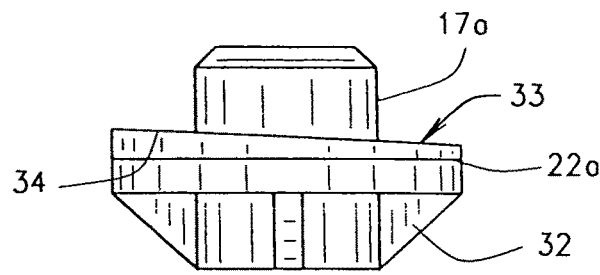
FIG. 6 is a rear view thereof.
Figure 7:
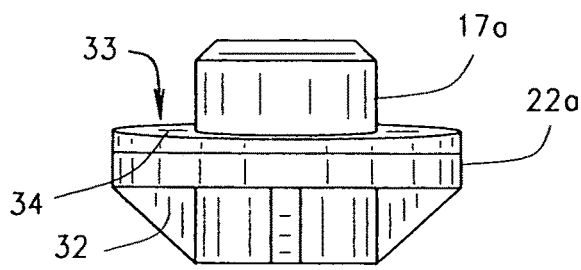
FIG. 7 is a left side view of the poppet skirt.
Figure 8:
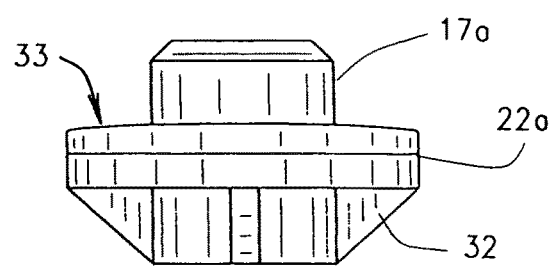
FIG. 8 is a right side view of the poppet skirt.
Figure 9:
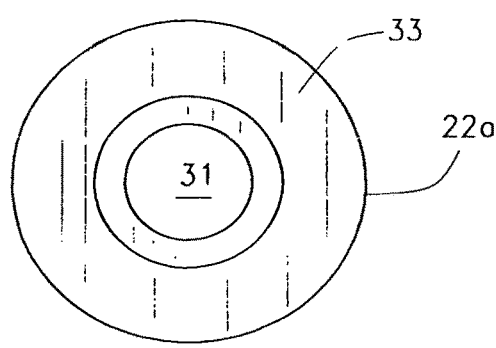
FIG. 9 is a top view.
Figure 10:
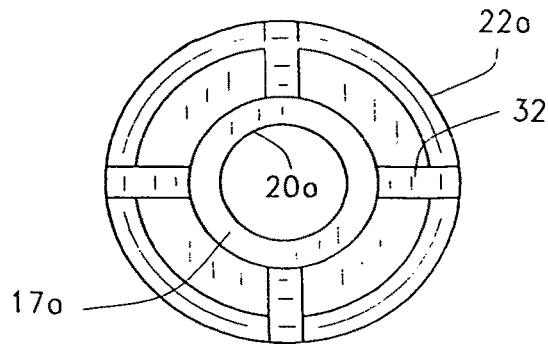
FIG. 10 is a bottom view of the poppet skirt of FIG. 4.
Figure 11:
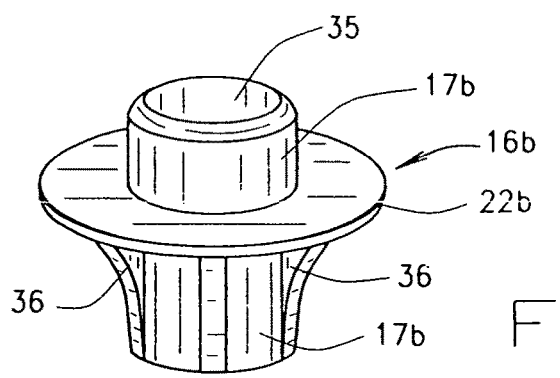
FIG. 11 is an isometric view of a modification to the tilted poppet skirt of this invention.
Figure 12:
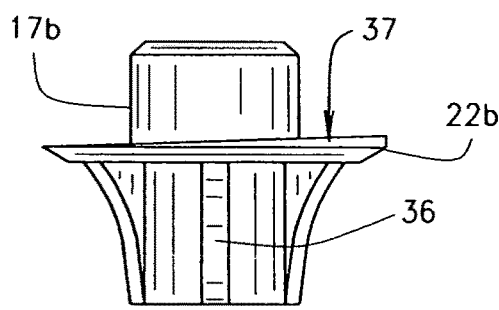
FIG. 12 is a front view thereof.
Figure 13:
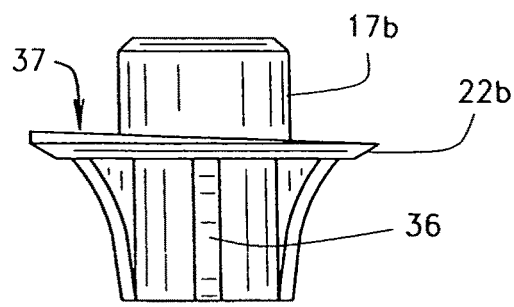
FIG. 13 is a rear view thereof.
Figure 14:
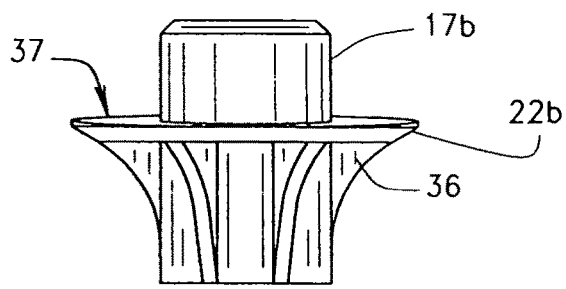
FIG. 14 is a left side view.
Figure 15:
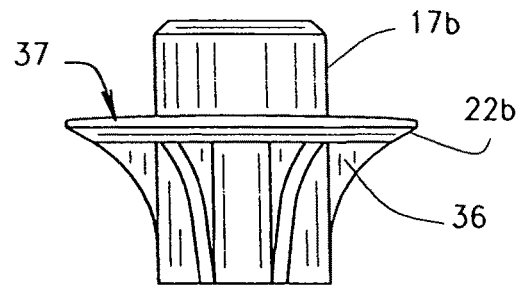
FIG. 15 is a right side view.
Figure 16:
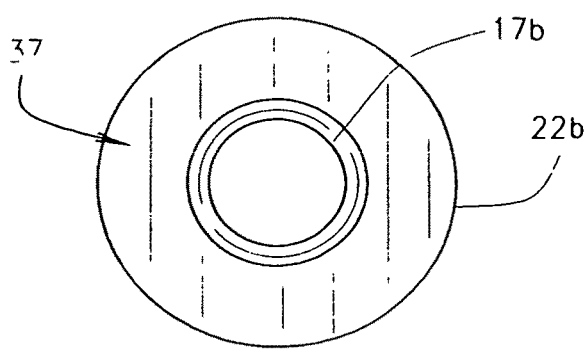
FIG. 16 is a top view.
Figure 17:
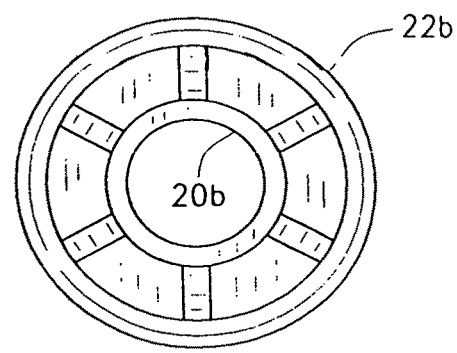
FIG. 17 is a bottom view of the tilted poppet skirt of FIG. 11.
Figure 18:
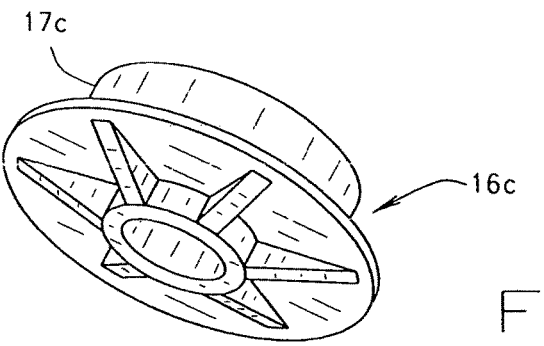
FIG. 18 is an isometric view of a further modified tilted poppet skirt of this invention.
Figure 19:
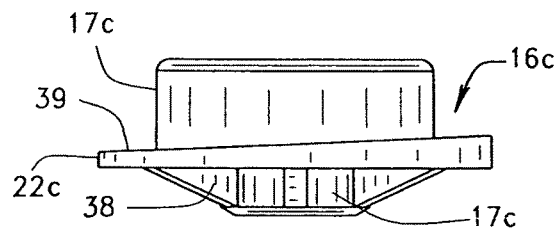
FIG. 19 is a front view thereof.
Figure 20:
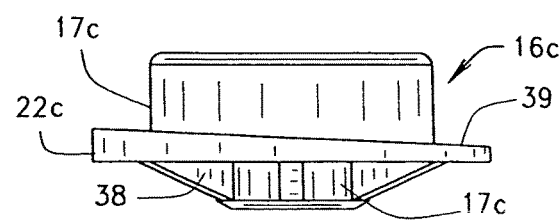
FIG. 20 is a back view thereof.
Figure 21:
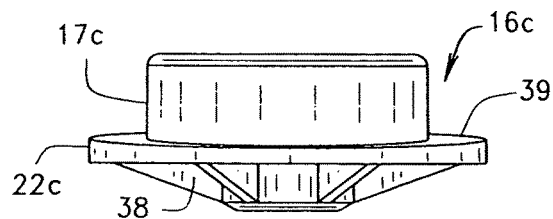
FIG. 21 is a left side view'
Figure 22:
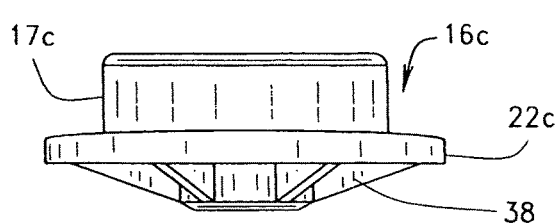
FIG. 22 is a right side view.
Figure 23:
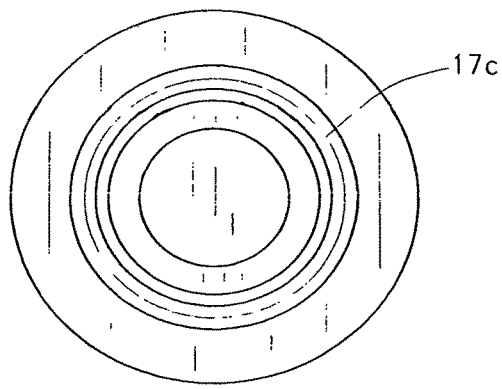
FIG. 23 is a top view.
Figure 24:
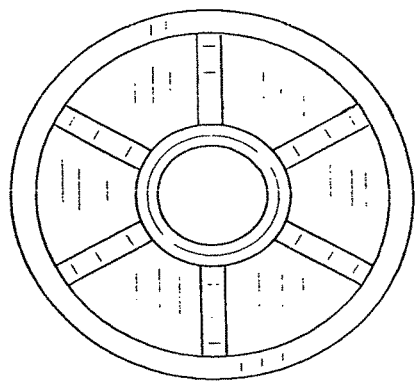
FIG. 24 is a bottom view of the modified tilted poppet skirt of FIG. 18.

The concept of this invention is to provide a gasoline dispensing nozzle, as shown at 1, in FIG. 1, incorporating a modified type of poppet valve assembly 2, generally as shown in an exploded view, also as noted, disclosing its various components axially separated, as seen in FIG. 2. Usually, such a poppet valve assembly, when interconnected together, and assembled will fit within the poppet opening or chamber 3, within the nozzle 1, as partially shown in FIGS. 2 and 3, and the nozzle casting has a valve seat type of arrangement, as at 4, and upon which the poppet valve rests, as to be subsequently described, when the assembled valve is located within the chamber 3, and the nozzle body cap 5 is threadedly engaged in place. It can be seen that the nozzle body cap 5 has a threaded surface, as at 6, and engages within compatible threads 7 provided within the poppet opening of the said fuel dispensing nozzle. Thus, as known in the operation of a poppet valve, within a nozzle, when the poppet valve is lifted, by manual raising of the nozzle lever 8, the poppet valve opens, allowing for the dispensing of fuel, generally at full load, through the nozzle handle casting 1, and out of its spout 8a, as known in the art.

When the poppet body cap 5 is threadedly engaged within the nozzle body 1, an O-ring 9 fits within the groove of 10 of the cap, in order to provide a fluidic seal between the cap and the nozzle body, when assembled.

The main spring 11 locates partially within the cap chamber 12, and the spring, when compressed, biases against the poppet holder 13 and the poppet holder retains within its lower recess 14 the poppet seal disc 15. It is the poppet holder 13, and its seal disc 15, that are biased by means of the pressure of the spring 11, against the valve seat 4 of the nozzle body, during closure of the fuel dispensing nozzle, as when not in dispensing usage.

The concept of this invention is generally embodied within the component identified as a tilt poppet skirt 16, having a main body housing 17 that fits through the aperture 18 of the seal disc, and locates within a center bore 19 provided within the poppet holder 4, as can be noted. The bottom part of the poppet skirt 16 includes a further cavity, as at 20, and it is into this cavity that the top of the poppet stem 21 locates, when assembled. In addition, the main body portion 17 of the poppet skirt includes an integral flange, as at 22, and the usage and functioning of this particular flange, in its specific construction, will be subsequently described.

Since, as known in the art, that the poppet stem 21 extends below the fluid flow pad within the nozzle 1, and exteriorly, so as to bias against the front part of the nozzle lever 8, a packing nut 23 is next provided upon the stem, and has the packing spring 24 located within its cavity 25 while the poppet stem 21 extends through the packing nut 23, as can be seen, and through its spring 24, and further extends through the packing gland washer 26, the O-ring 27, and has its packing top 28 applied thereon, in addition to a further O-ring 29 before the packing seal 30 engages within the packing nut 23, in order to provide a fluidic seal for the stem 21, as it extends through these components, and contacts its bottom 31 against the front part of said nozzle lever 8, as known in the art.

The concept of this invention, which is generally identified as a titled poppet valve, is generally constructed within the configuration of the poppet skirt 16, generally identified as the tilt poppet skirt of this invention.

One embodiment of this tilt poppet skirt can be seen at 16a. It includes its main body portion 17a, which, as previously described, is closed at its top surface, as noted at 31. These can all be seen in FIGS. 4-10, as noted. Then, the bottom of the main body portion 17a has a cavity 20a which is receptive for receiving the top of the poppet stem 21, as previously reviewed. And, it can be seen that a flange 22a extends outwardly from its integral formation with the main body portion 17a, and has a greater diameter than the said body portion, as can be noted. Reinforcement between the flange 22a and the lower part of the main body portion 17a of the poppet skirt includes the reinforcements, in the form of ribs 32 to provide support for the flange to furnish its operative aspects when used in the poppet valve assembly of this invention. The essence of the invention is the provision of an upper surface, as at 33, for the identified flange, and which may have an inclination, slope, or incline of approximately 1 degree to 7 degrees off the horizontal, as at 34, so that when the poppet stem 21 is raised upwardly, through manipulation of the nozzle lever 8, the inclined surface biases against the poppet holder 13, and its seal disc 15, to skew or tilt its opening, from upon the nozzle valve seat 4, to allow for initially, or at the end of dispensing, of a miniscule flow or trickle of the fuel through the nozzle, so that more precise quantities or value of fuel can be dispensed, particularly by the self service customer, as can be understood. It is the biasing of the inclined surface 33 against that seal disc 15 that causes only the one side of the seal disc initially to raise off of the valve seat 4, to provide for this lower flow of fuel through the nozzle, until such time as the nozzle lever 8 is fully pulled upwardly, to completely remove the seal disc from its valve seat, to allow for the normal and full flow of fuel through the nozzle during normal dispensing of its gasoline, diesel fuel, or the like.

This type of poppet skirt may be formed of an endurable material, such as rubber having a high durometer hardness, or of a polymer, such as polypropylene, polyurethane, or any other type of polymer molded material that can withstand constant usage, for the purposes as described herein.

FIGS. 11-17 show a further embodiment for the poppet skirt 16b of this invention. It also includes a main body portion 17b having a closed top 35 and an extending flange 22b as can be noted. Various reinforcing ribs 36 are likewise shown, integral with the lower part of the main body portion 17b, as noted. And as can be further noted, in order to attain the attributes of this invention, the upper part of the integral flange 22b is inclined, as can be noted at 37, so that when the poppet stem 21, that fits within the bottom opening 20b of the skirt, is raised by means of the nozzle lever 8, that inclined surface 37 of the skirt 16b skews the seal disc 15, within its poppet holder 13, to allow for, initially, or at the end of dispensing a trickle flow of gasoline through and from the nozzle spout, as noted in FIG. 1, particularly when filing up the fuel tank of a vehicle. Once again, the incline of the upper surface of the flange 22b, will generally be within a range of from 1 degree to 7 degrees, and in the preferred embodiment, somewhere between approximately 3 degrees to 4 degrees off of the horizontal of the flange, as can be understood. This can clearly be seen in FIGS. 12 and 13.

A further embodiment for the tilt poppet skirt for this invention can be seen at 16c, as noted in FIGS. 18-24. This skirt has related structure to that of the poppet skirt as previously reviewed, and includes a main body portion 17c, having a bottom part of the main body portion, as likewise noted at 17c, and with reinforcing ribs 38 provided to strengthen the structure during its application. This embodiment further includes its extending flange 22c, which is formed, upon its upper surface 39, with an incline, off of the horizontal, at the range of degrees as previously reviewed, such that, in operation, when the poppet skirt is lifted, by means of the stem 21, it elevates only a small portion of the poppet seal disc 15, within its poppet holder 13, off of the poppet valve seat 4, as previously reviewed, integrally provided within the nozzle 1, as where noted in FIGS. 2 and 3.

Thus, the concept of this invention is to provide within a singular structure, and not through usage of multiple components, a means to slightly lift only a portion or segment of the poppet seal disc off of its nozzle valve seat, so as to allow for a minor flow of fuel, or a trickle flow, as known in the art, which can be achieved through usage of the inclined integral flanges, as previously reviewed, and as structured into the tilt poppet skirt of this invention.

Figure 25A:
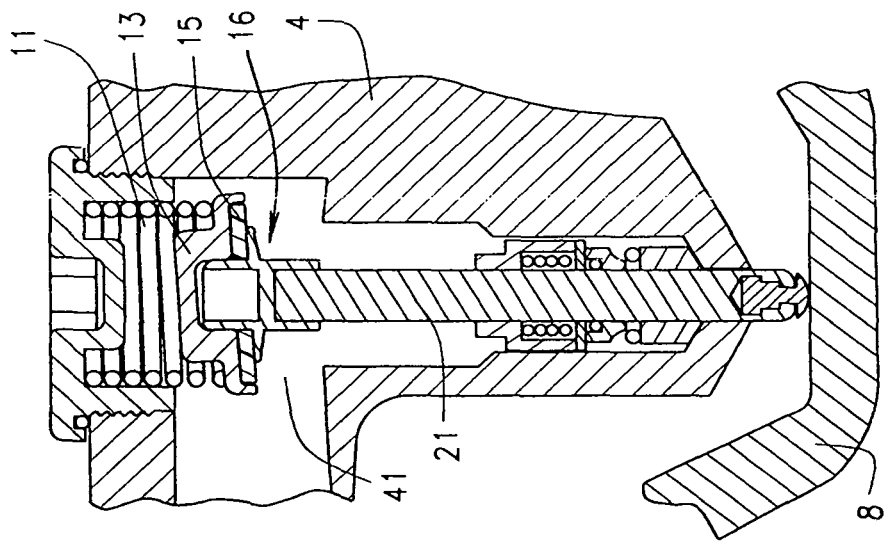
FIG. 25a shows the tilted poppet skirt of this invention embodied in the poppet assembly and arranged in its normally-closed position.
Figure 25B:
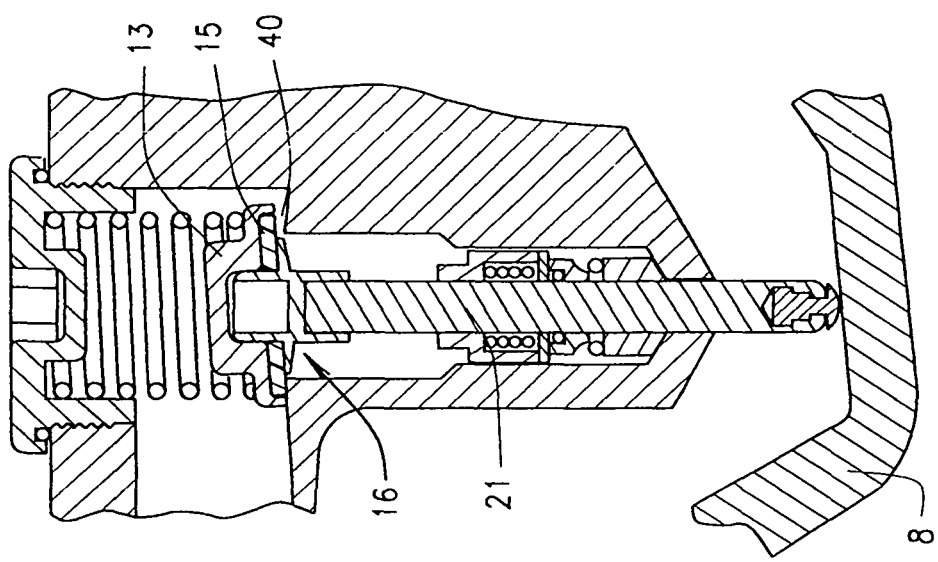
FIG. 25b shows the tilted poppet skirt of this invention being slightly elevated by lifting of the nozzle handle where the tilted poppet is beginning to "peel" the poppet seal off of its valve sealing surface as provided within the nozzle.
Figure 25C:
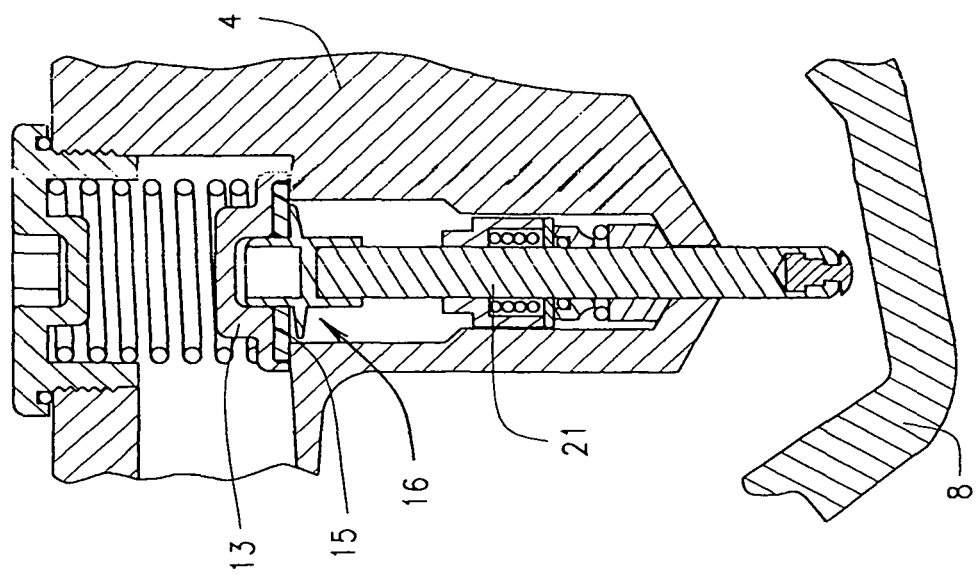
FIG. 25c shows the tilted poppet skirt of this invention when the nozzle handle is fully elevated, forcing the poppet seal disc and poppet holder totally opened, thereby allowing for the full flow of fuel through the dispensing nozzle during refueling of a vehicle.

The usage of this invention, within a fuel dispensing nozzle, can be seen in FIGS. 25a-25c. As noted in 25a, the tilt poppet skirt 16 of this invention, locates within the poppet holder 13, and the poppet stem 21 locates within the poppet skirt, but since the lever 8 is at rest, and not being elevated or used, the seal disc 15 engaged upon the nozzle valve seat 4, while no fuel is being dispensed through the at rest nozzle. As can be seen in FIG. 25b, the lever 8 has been slightly elevated, and its stem 21 slightly pushes the poppet skirt 16 upwardly, a minor space, as at 40, so that only a small gap is provided at the location between the poppet holder 13 and its seal disc 15 to provider for a miniscule flow of fuel through the nozzle, when that condition is maintained. Then, as noted in FIG. 25c, when the nozzle lever 8 is fully elevated, and the stem 21 likewise is fully raised, the poppet skirt 16 fully elevates the poppet holder 13 and its located seal disc 15 upwardly, as against the compression of the main spring 11, furnishing a wide opening of the space between the seal disc, and the nozzle valve seat 4, such space as can be clearly seen at 41, to allow for the full flow of fuel through the nozzle when being dispensed into the fill pipe of a vehicle, during application of the dispensing system, and through usage of the invention as described herein. As noted, the functionality of this invention is generally as described for the embodiment, and in the condition of its usage, as shown and explained in FIG. 25b. As previously noted, the tilt poppet skirt employs that inclined surface of its flange, in order to peel the poppet holder and its seal disc off of the valve seat and sealing surface of the nozzle body casting, in order to provide for a slight opening between these components, that allows one to furnish a minor or trickle flow of fuel, in order to dispense fuel at a precise quantity, and value, generally known as "rounding to the penny" when dispensing fuel into a vehicle.

Variations or modifications to the subject matter of this invention may occur to those skilled in the art upon review of the summary of the invention as provided herein, and upon undertaking a study of the description of its preferred embodiment. Such variations, if within the spirit of this invention, are intended to be encompassed within the scope of any claims to patent protection issuing herein. The disclosure of the invention in the drawings, and as described in the specification, are set forth for illustrative purposes only.

We claim:

1. A poppet valve accessory for use with a fuel dispensing nozzle having a lever for manipulation during fuel dispensing, and for delivery of fuel to a vehicle, said poppet valve accessory including a poppet stem, a poppet holder, a poppet seal disc within said poppet holder, and a body cap for the poppet accessory when installed within the nozzle, and said body cap and a main spring for use for normally biasing the poppet seal disc against a nozzle valve seat when said fuel nozzle is closed to prevent dispensing of fuel through the nozzle;

a poppet skirt provided within said poppet valve accessory and arranged in alignment with the poppet valve accessory and said skirt connecting to the top of said poppet stem which when the nozzle lever is actuated, said poppet skirt is lifted and elevates the poppet seal disc off of said nozzle valve seat to initiate the delivery of fuel to a vehicle;

said poppet skirt having a main body portion, said body portion having a central cavity provided therein and opened at the bottom of said poppet skirt, and closed at the top of said poppet skirt, wherein said poppet stem fits within the poppet skirt cavity during assembly of said accessory in preparation for usage; and an integral flange provided extending from the main body portion of said poppet skirt and having a diameter greater than the diameter of said main body portion, and said flange having an upper surface, said upper surface being an inclined surface so that as the poppet skirt contacts the poppet seal disc upon actuation of the nozzle lever for delivery of fuel from the nozzle, the poppet skirt inclined flange surface initially lifts an edge of the poppet seal disc off of the nozzle valve seat to provide an initial reduced flow of fuel for dispensing from the nozzle during operation.

2. The nozzle poppet valve accessory of claim 1, wherein the inclined surface of said upper surface of the poppet skirt flange is between approximately 1 degree to 7 degrees off the horizontal.

3. The nozzle poppet valve accessory of claim 2, wherein the inclined surface of the upper surface of said poppet skirt flange is between approximately 3 degrees to 4 degrees off the horizontal, whereby when the fuel nozzle is initially actuated or at the end of fueling providing, for a reduced flow of fuel from the nozzle during dispensing.

4. The nozzle poppet valve accessory of claim 1, wherein in said poppet skirt is made of a polymer.

5. The nozzle poppet valve accessory of claim 1, wherein said poppet skirt flange having a bottom surface, and reinforcement structure provided between the bottom surface of said flange and the poppet skirt main body portion to provide reinforcement to said flange during usage.

6. The nozzle poppet valve accessory of claim 5, wherein said reinforcement structure comprises a series of integral ribs.

7. The nozzle poppet valve accessory of claim 2, wherein said inclined surface of said poppet skirt flange tilts the poppet seal disc off of the nozzle valve seat to provide for a trickle flow of fuel from the fuel nozzle during or when completing dispensing.

* * * * *